(12) United States Patent
Li

(10) Patent No.: US 10,438,377 B2
(45) Date of Patent: Oct. 8, 2019

(54) METHOD AND DEVICE FOR PROCESSING A PAGE

(71) Applicant: Beijing Xiaomi Mobile Software Co., Ltd., Beijing (CN)

(72) Inventor: Guosheng Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 15/822,043

(22) Filed: Nov. 24, 2017

(65) Prior Publication Data

US 2018/0150978 A1     May 31, 2018

(30) Foreign Application Priority Data

Nov. 25, 2016   (CN) .......................... 2016 1 1056406

(51) Int. Cl.
*G06T 11/00*  (2006.01)
*G09G 3/20*  (2006.01)
(Continued)

(52) U.S. Cl.
CPC .......... *G06T 11/001* (2013.01); *G09G 3/2003* (2013.01); *G09G 5/02* (2013.01);
(Continued)

(58) Field of Classification Search
None
See application file for complete search history.

(56) References Cited

U.S. PATENT DOCUMENTS

| | | | | |
|---|---|---|---|---|
| 5,581,633 A | * | 12/1996 | Hotta | G06K 9/348 382/171 |
| 5,889,885 A | * | 3/1999 | Moed | G06K 9/38 382/171 |

(Continued)

FOREIGN PATENT DOCUMENTS

| | | |
|---|---|---|
| CN | 101340511 A | 1/2009 |
| CN | 102194440 A | 9/2011 |

(Continued)

OTHER PUBLICATIONS

Extended European Search Report dated Feb. 22, 2018 in Patent Application No. 17202234.5 citing reference AA therein, 9 pages.

(Continued)

*Primary Examiner* — Yanna Wu
(74) *Attorney, Agent, or Firm* — Oblon, McClelland, Maier & Neustadt, L.L.P.

(57) ABSTRACT

The disclosure relates to a method and device for processing a page. The method includes calculating an average brightness value of pixels in a page on a display; determining whether the average brightness value exceeds a preset brightness threshold; selecting target pixels from the page when the average brightness value exceeds the preset brightness threshold, wherein the target pixels include at least one of first target pixels and second target pixels, the first target pixels including sub-pixels, any two of which have a brightness difference that is less than a preset difference value, and the second target pixels including background pixels and character pixels; and performing a color reversion operation on the target pixels.

7 Claims, 4 Drawing Sheets

(51) Int. Cl.
*G09G 5/02* (2006.01)
*G06T 11/60* (2006.01)

(52) U.S. Cl.
CPC ............... *G09G 2320/066* (2013.01); *G09G 2320/0626* (2013.01); *G09G 2360/16* (2013.01)

(56) References Cited

U.S. PATENT DOCUMENTS

| | | | |
|---|---|---|---|
| 6,192,163 B1* | 2/2001 | Murayama | G06T 5/20 |
| | | | 382/199 |
| 6,424,746 B1* | 7/2002 | Nishida | G06K 9/6204 |
| | | | 382/195 |
| 2003/0080967 A1* | 5/2003 | Milch | G09G 3/3208 |
| | | | 345/589 |
| 2004/0042677 A1 | 3/2004 | Lee | |
| 2004/0076337 A1* | 4/2004 | Nishida | G06K 9/38 |
| | | | 382/274 |
| 2013/0083377 A1* | 4/2013 | Ding | G06T 5/007 |
| | | | 358/530 |

FOREIGN PATENT DOCUMENTS

| | | | |
|---|---|---|---|
| CN | 104391691 A | 3/2015 | |
| CN | 104517268 A | 4/2015 | |
| CN | 104850372 A | 8/2015 | |
| CN | 104934016 A | 9/2015 | |

OTHER PUBLICATIONS

Chinese Office Action dated Sep. 29, 2017 in Chinese Patent Application 201611056406.7.

* cited by examiner

METHOD AND DEVICE FOR PROCESSING A PAGE

CROSS-REFERENCE TO RELATED APPLICATIONS

The present application is based upon and claims priority to Chinese Patent Application No. 201611056406.7 filed on Nov. 25, 2016, the entire contents of which are incorporated herein by reference.

TECHNICAL FIELD

The present disclosure relates to the field of display technology, and more particularly, to a method and device for processing a page on a display.

BACKGROUND

With development of display technologies, a terminal device can display various pages with certain brightness. When the involved environment darkens, the page displayed on the terminal device often looks more glaring. In order to protect a user's eyes, the page may be processed such that the brightness of the page is reduced. Reducing the brightness in this manner, however, also decreases the contrast of the page, thus degrading the definition of the displayed content on the page.

SUMMARY

This summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for processing a page. The method includes calculating an average brightness value of pixels in a page on a display; determining whether the average brightness value exceeds a preset brightness threshold; selecting target pixels from the page when the average brightness value exceeds the preset brightness threshold, wherein the target pixels include at least one of first target pixels and second target pixels, the first target pixels including sub-pixels, any two of which have a brightness difference that is less than a preset difference value, and the second target pixels including background pixels and character pixels; and performing a color reversion operation on the target pixels.

The target pixels include the first target pixels, and each pixel in the page includes a plurality of sub-pixels. Selecting the target pixels from the page includes determining, for each pixel in the page, a brightness value of each of the plurality of sub-pixels of the pixel; calculating a brightness difference between each of the plurality of sub-pixels; and selecting a pixel from the page when the brightness difference between each of the plurality of sub-pixels of the pixel is less than the preset difference value.

The target pixels comprise the second target pixels. Selecting the target pixels from the page includes identifying background pixels and character pixels of the page; and selecting the background pixels and the character pixels from the page.

Calculating the average brightness value of the pixels in the page includes calculating a sum of brightness values of all sub-pixels in the page; calculating a total number of the sub-pixels in the page; and calculating a ratio of the sum of brightness values of the sub-pixels with respect to the total number of the sub-pixels.

Performing the color reversion operation on the target pixels includes determining a brightness value of each one of a plurality of sub-pixels in the target pixel; calculating, for each one of the plurality of sub-pixels in the target pixel, a difference between a preset maximum brightness and the brightness value of the sub-pixel; and performing a color reversion on the target pixel by using the difference as a reversed color of the sub-pixel.

Aspects of the disclosure also provide a device for processing a page. The device includes a display, a processor, and a memory for storing instructions executable by the processor. The processor is configured to calculate an average brightness value of pixels in a page on the display; determine whether the average brightness value exceeds a preset brightness threshold; select target pixels from the page when the average brightness value exceeds the preset brightness threshold, wherein the target pixels include at least one of first target pixels and second target pixels, the first target pixels including sub-pixels, any two of which have a brightness difference that is less than a preset difference value, and the second target pixels including background pixels and character pixels; and perform a color reversion operation on the target pixels.

The target pixels include the first target pixels, and each pixel in the page includes a plurality of sub-pixels. The processor is also configured to determine, for each pixel in the page, a brightness value of each of the plurality of sub-pixels of the pixel; calculate brightness difference between each of the plurality of sub-pixels; and select a pixel from the page when the brightness difference between each of the plurality of sub-pixels of the pixel is less than the preset difference value.

The target pixels include the second target pixels. The processor is also configured to identify background pixels and character pixels in the page; and select the background pixels and the character pixels from the page.

The processor is also configured to calculate a sum of brightness values of all sub-pixels in the page; calculate a total number of the sub-pixels in the page; and calculate a ratio of the sum of brightness values of the sub-pixels with respect to the total number of the sub-pixels.

The processor is also configured to determine a brightness value of each one of a plurality of sub-pixels in the target pixel; calculate, for each one of the plurality of sub-pixels in the target pixel, a difference between a preset maximum brightness and the brightness value of the sub-pixel; and perform color reversion of the target pixel by using the difference as a reversed color of the sub-pixel.

Aspects of the disclosure also provide a non-transitory computer-readable storage medium having instructions that, when executed by one or more processors of a terminal device, cause the terminal device to calculate an average brightness value of pixels in a page on a display; determine whether the average brightness value exceeds a preset brightness threshold; select target pixels from the page when the average brightness value exceeds the preset brightness threshold, wherein the target pixels include at least one of first target pixels and second target pixels, the first target pixels including sub-pixels, any two of which have a brightness difference that is less than a preset difference value, and the second target pixels including background pixels and character pixels; and perform a color reversion operation on the target pixels.

It is to be understood that both the foregoing general descriptions and the following detailed description are exemplary and explanatory only and do not limit the scope of the disclosure.

BRIEF DESCRIPTION OF THE DRAWINGS

The drawings herein are incorporated in and constitute a part of this specification, showing aspects consistent with the present disclosure, and together with the descriptions, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
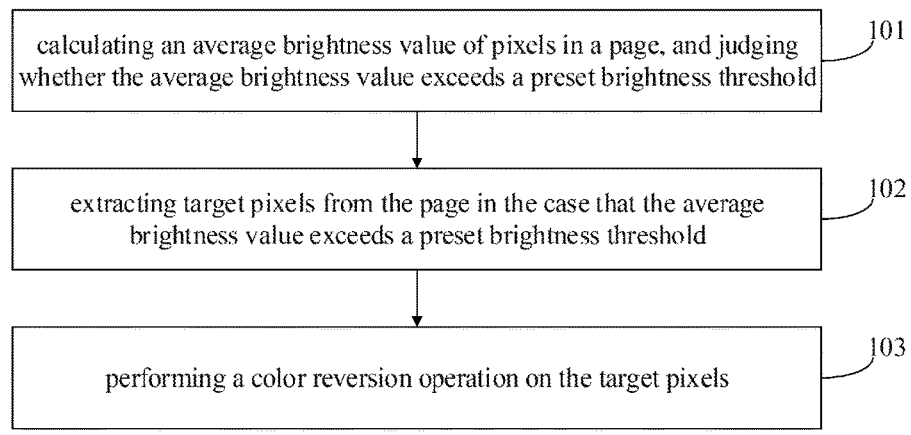
FIG. 1 is a flow chart of a method for processing a page in accordance with an exemplary aspect of the present disclosure.

FIG. 1 is a flow chart of a method for processing a page in accordance with an exemplary aspect. The method is applicable in a terminal device, and includes the following steps, as shown in FIG. 1.

In step 101, an average brightness value of pixels in a page is calculated, and a judgment as to whether the average brightness value exceeds a preset brightness threshold is made. The preset brightness threshold is used to specify a minimum brightness for a brighter page.

In step 102, target pixels are extracted from the page in the case that the average brightness value exceeds a preset brightness threshold. The target pixels include at least one of first target pixels and second target pixels. The first target pixels are pixels respectively including sub-pixels, any two of which have a brightness difference smaller than a preset difference, and the second target pixels include background pixels and character pixels.

In step 103, a color reversion operation is performed on the target pixels.

With the method provided by an exemplary aspect, by calculating an average brightness value of pixels in a page, judging whether the average brightness value exceeds a preset brightness threshold, extracting target pixels from the page in the case that the average brightness value exceeds a preset brightness threshold, and performing a color reversion operation on the target pixels, it is able to reduce brightness of the page with contrast of the page being remained unchanged, and thus influence of brightness reduction on definition of the page can be avoid.

In some aspects, the target pixels may include the first target pixels, and the extracting target pixels from the page may include: determining, for each pixel in the page, brightness of each of sub-pixels of the pixel; calculating brightness difference between every two sub-pixels between different sub-pixels; and extracting the pixel from the page in the case that the brightness difference between every two sub-pixels is less than a preset difference value.

In some aspects, the target pixels may include the second target pixels, and the extracting target pixels from the page may include: acquiring background pixels and character pixels of the page; and extracting the background pixels and the character pixels from the page.

In some aspects, the calculating an average brightness value of pixels in the page may include: calculating a sum of brightness of sub-pixels in the page; calculating a total number of the sub-pixels in the page; and calculating a ratio of the sum of brightness of sub-pixels with respect to the total number of the sub-pixels.

In some aspects, the performing a color reversion operation on the target pixels may include: determining brightness of each of sub-pixels in a target pixel; calculating, for each of sub-pixels in the target pixel, a difference between a preset maximum brightness and brightness of the sub-pixel; and performing a color reversion on the target pixel by using the difference as reversed color of the sub-pixel.

The aspects described above may be combined in any way to form alternative aspects of the present disclosure, which will not be described again herein.

Figure 2:
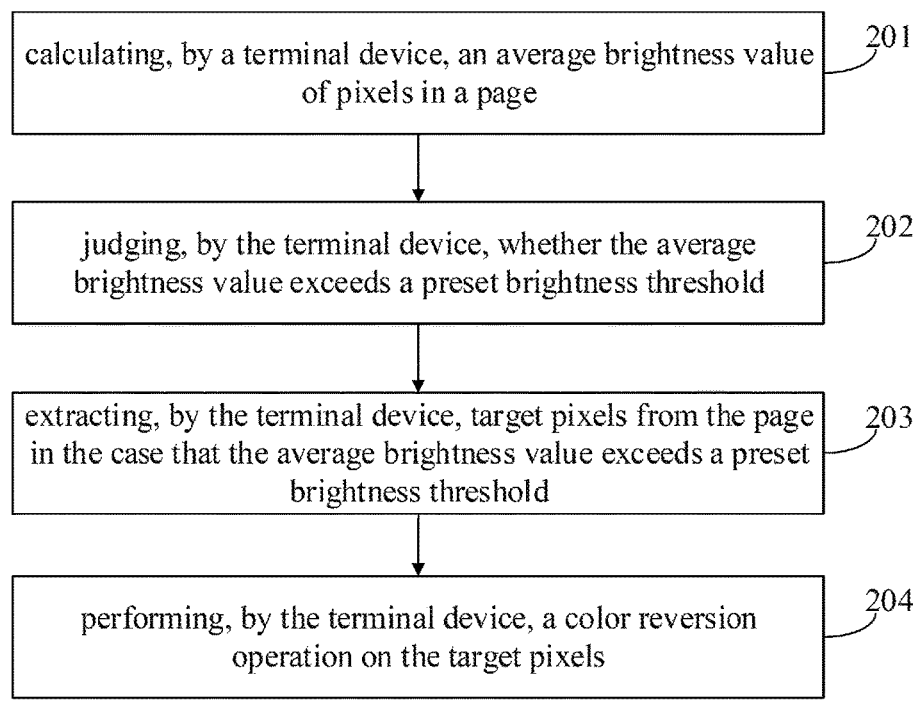
FIG. 2 is a flow chart of method for processing a page in accordance with an exemplary aspect of the present disclosure.

FIG. 2 is a flow chart of a method for processing a page in accordance with an exemplary aspect. The method is applicable in a terminal device, and includes the following steps, as shown in FIG. 2.

In step 201, an average brightness value of pixels in a page is calculated by a terminal device.

The terminal device may be a mobile phone, a computer, or the like, and the page may be any page displayed on the terminal device, such as a page of an operating system or a page of an application. The present aspect is not limited thereto. The average brightness value of pixels in the page is used to indicate brightness level of the page. The greater the average brightness value is, the higher brightness level of the page is, indicating that the page looks brighter.

The average brightness value may be calculated by the following steps 2011-2013.

In step 2011, a sum of brightness of sub-pixels in the page is calculated by the terminal device.

Since a page is composed of a plurality of pixels, so brightness of the page depends on brightness of each of pixels in the page. Therefore, when an average brightness value of pixels of the page is calculated, brightness of each of the pixels in the page must be taken into consideration.

Further, each pixel includes a plurality of sub-pixels, each of which has a plurality of brightness levels, so brightness of each pixel depends on brightness of the plurality of sub-pixels in the pixel. Therefore, the terminal device, after acquiring any one of pixels in the page, can determine brightness of respective sub-pixels in the pixel and calculate a sum of the brightness of respective sub-pixels in the pixel, that is, sub-pixel brightness sum for the pixel. Each pixel includes sub-pixels of three colors, i.e., a red sub-pixel, a green sub-pixel and a blue sub-pixel, and each sub-pixel has 256 brightness levels. Thus, the terminal device can determines, for a pixel, brightness of a red sub-pixel as r, brightness of a green sub-pixel as g, and brightness of a blue sub-pixel as b, and then determines a sum of brightness of respective sub-pixels in the pixel as r+g+b, for example.

Therefore, the terminal device can acquire every pixel from the page, and determines, on a pixel basis, sub-pixel brightness sum of respective pixels by using the above discussed method, and then add the sub-pixel brightness sum of respective pixels to get sub-pixel brightness sum for the page. The terminal device may use progressive scanning, column-by-column scanning, etc. to obtain each pixel, and the aspect is not limited thereto.

In step 2012, a total number of sub-pixels in the page is calculated by the terminal device.

The terminal device can acquire the number of horizontal pixels in a horizontal direction of the page and the number of vertical pixels in a vertical direction of the page, and use a product by multiplying the number of horizontal pixels and the number of vertical pixels as the total number of pixels of the page. Since each pixel includes multiple sub-pixels, the total number of pixels of the page can be multiplied by the number of sub-pixels in each pixel to obtain the total number of sub-pixels in the page.

In an example, if the number of pixels in a horizontal direction of a page is 1920, the number of pixels in a vertical direction is 1080 and each pixel in the page includes three sub-pixels, the total number of sub-pixels of the page is 1920*1080*3-6220800.

In step 2013, a ratio of the sum of brightness of sub-pixels with respect to the total number of the sub-pixels is calculated by the terminal device.

After the terminal device determines the sum of brightness of the sub-pixels and the total number of the sub-pixels for the page, the terminal device can calculate a ratio of the sum of brightness of sub-pixels with respect to the total number of the sub-pixels and use it as the average brightness value of the page.

In step 202, whether the average brightness value exceeds a preset brightness threshold is judged by the terminal device.

The present aspect is used to reduce brightness of the page while avoiding a decrease in the contrast, so what should be processed is a brighter page. In order to distinguish a brighter page from a darker page, a preset brightness threshold is set for specifying a minimum brightness of a brighter page. The preset brightness threshold may be 127, or other values, and the present disclosure is not limited thereto.

Therefore, in order to determine whether the page is a brighter page, the terminal device, after acquiring the average brightness value of the pixels in the page, will determine whether the average brightness value exceeds the preset brightness threshold. The page is determined as a brighter page only if the average brightness value of the pixels in the page exceeds the preset brightness threshold.

On the other hand, if it is determined that the average brightness value of the pixels in the page does not exceed the preset brightness threshold, the terminal device determines that the page is a darker page, and at this time the brightness of the page can be directly reduced without performing the following steps 203 to 204.

In step 203, target pixels are extracted from the page if the terminal device determines that the average brightness value exceeds the preset brightness threshold.

In the case that the average brightness value exceeds the preset brightness threshold, the terminal device determines that the page is a brighter page and extracts target pixels from the page. The target pixels are pixels in the page to be subjected to color inversion processing.

In practice, background pixels, as compared with other pixels, often occupy most part of the page, so if the brightness of the background pixels is higher, the average brightness value of pixels in the page is bigger accordingly. Therefore, the brightness of the background pixels is a key factor affecting the brightness of the page, and thus in order to reduce the brightness of the page, the background pixels can be used as the target pixels, and can be processed, during reduction of brightness of the page, by the color reversion operation. Further, in addition to the background pixels, there are character pixels. In order to ensure that the user can distinguish the background pixels from the character pixels to clearly identify the character pixels, the character pixels should be also treated as target pixels and processed by a color reversion operation when the background pixels are processed by a color reversion operation.

Therefore, in order to obtain the background pixels and the character pixels, the present aspect may include the following two possible implementations.

In a first possible implementation, the target pixels include first target pixels, which are pixels respectively including sub-pixels, any two of which have a brightness difference smaller than a preset difference.

In order to facilitate a user's browsing, background pixels and character pixels in a page are usually non-colorful pixels, and picture pixels are colorful pixels, and a brightness difference between any two sub-pixels in a non-colorful pixel is generally small. Thus, the terminal device can acquire a non-colorful pixel based on a brightness difference between any two sub-pixels in the pixel as a target pixel.

In an example, if brightness difference between any two sub-pixels in a pixel is large, the pixel is a colorful pixel, and if bright difference of any two sub-pixels in the pixel is small, the pixel is a non-colorful pixel (for example, the pixel is a black pixel if brightness of respective sub-pixels in the pixel is 0, and the pixel is a white pixel if brightness of respective sub-pixels in the pixel is 255).

Thus, for each pixel in the page, the terminal device can determine brightness of each of sub-pixels in the pixel, calculate brightness difference between any two sub-pixels between different sub-pixels, compare the brightness difference between any two sub-pixels with a preset difference, and determine the pixel is a target pixel if the bright difference of any two sub-pixels is smaller than the preset difference in order for extraction from the page. The preset difference may be 0, 1, 2, etc., and the present disclosure is not limited thereto.

In an example, the terminal device may determine brightness of a red sub-pixel, brightness of a green sub-pixel and brightness of a blue sub-pixel in each pixel, calculate a first brightness difference between the red sub-pixel and the green sub-pixel, a second brightness difference between the red sub-pixel and the blue sub-pixel, a third brightness difference between the green sub-pixel and the blue sub-pixel, and determine the brightness difference of any two sub-pixels based on the first brightness difference, the second brightness difference, and the third brightness difference. For example, the maximum value among the first brightness difference, the second brightness difference and the third brightness difference may be used as the luminance difference of any two sub-pixels.

In a second possible implementation, the target pixels include second target pixels including background pixels and character pixels.

In practice, determination as to whether a pixel in a page is a background pixel, a character pixel or a picture pixel may be made in accordance with brightness difference of any two sub-pixels in the pixel, or in accordance with content of the page. Thus, the terminal device can identify content of the page to directly acquire background pixels and text pixels of the page and extract them from the page.

In an example, the terminal device may divide the page into a plurality of areas, extract features of respective areas, and identify content of respective areas according to the features thereof. If it is determined that content of an area belongs to background or characters, pixels within the area are determined as target pixels. The feature may be a feature such as color, texture, shape, semantic, text, etc., and the present disclosure is not limited thereto.

In addition, the terminal device may determine color of a pixel based on brightness of a red sub-pixel, brightness of a green sub-pixel and brightness of a blue sub-pixel in the pixel, and directly determine whether or not the pixel is a target pixel based on the color of the pixel. For example, if it is determined that brightness of a red sub-pixel, brightness of a green sub-pixel and brightness of a blue sub-pixel in the pixel are all 0, the pixel is determined to be a white pixel, and will be used as a target pixel.

In step 204, a color reverse operation is performed by the terminal device on the target pixels.

The terminal device may determine brightness of each of sub-pixels in a target pixel, calculate, for each of sub-modules in the target pixel, a difference between brightness of the sub-pixel and a preset maximum brightness, and perform a color reversion of the target pixel by using the difference as reversed color of the sub-pixel.

The preset maximum brightness refers to a maximum brightness for a sub-pixel. In the case that a sub-pixel has 256 brightness level from 0 to 255, the preset maximum brightness is 255. Assuming the brightness of a red sub-pixel in the target pixel is r, brightness of a green sub-pixel is g, brightness of a blue sub-pixel is b, the luminance of the red sub-pixel in the target pixel after the reverse color is 255-r, the target pixel, after the color reversion, has the red sub-pixel with brightness of 255-g, the green sub-pixel with brightness of 255-g, and the blue sub-pixel with brightness of 255-b. For example, if the target pixel is a white pixel with r=g=b=, the target pixel will becomes a black pixel with r=g=b=255 after the color reversion operation.

In the present aspect, after the brighter background pixels and the darker character pixels in the page are color-reversed, the background pixels of the page become darker and the character pixels of the page become brighter, which enables brightness of the page to be reduced. On the other hand, the contrast is determined by difference between different pixels, so since difference between the background pixels and the character pixels in the page is not greatly changed after their color reversion, the contrast does not decrease and in turn definition of the page is not influenced. This also ensures that the background pixels and character pixels can be clearly distinguished, to help a user accurately identify character pixels from the background pixels.

In an example, for an e-book page, its background pixels are generally white pixels and character pixels are generally black pixels in order to ensure that a user can clearly recognize the character pixels from the background pixels. After the white pixels in the page are color-reversed to be black pixels and the black pixels are color-reversed to be white pixels, background of the page changes from white to black, which reduces brightness of the page. Further, since characters in the page changes from black to white, they have strong contrast to the black background such that the page has higher contrast to ensure a user can read as usual.

It should be noted that the color pixels in the page are generally picture pixels. In one hand, the picture pixels occupy a small part of the page, they have smaller effect on brightness of the page. On the other hand, after the picture pixels are color-reversed, the involved picture may be distorted, and thus visual effect of the page may be deteriorated. Therefore, the image pixels are not subjected to the color reversion process in the present aspect.

With the method provided by the present aspect, by calculating an average brightness value of pixels in a page, judging whether the average brightness value exceeds a preset brightness threshold, extracting target pixels from the page in the case that the average brightness value exceeds a preset brightness threshold, and performing a color reversion operation on the target pixels, it is able to reduce brightness of the page with contrast of the page being remained unchanged, and thus influence of brightness reduction on definition of the page can be avoid Furthermore, only background pixels and character pixels of the page are color-reversed without picture pixels being subject to color reversion process, it is able to ensure that a user can distinguish between the background pixels and the character pixels to clearly identify the character pixels, and ensure that picture pixels will not be distorted in order to avoid impact of beauty of the page due to reduces brightness.

In addition, the method provided by the present aspect is applicable to process not only a page of an operating system of a terminal device but also a page of any of various applications installed in the terminal device, to meet the requirement for reducing brightness of any of various pages, which extends functionality of the terminal device and improves flexibility.

Figure 3:
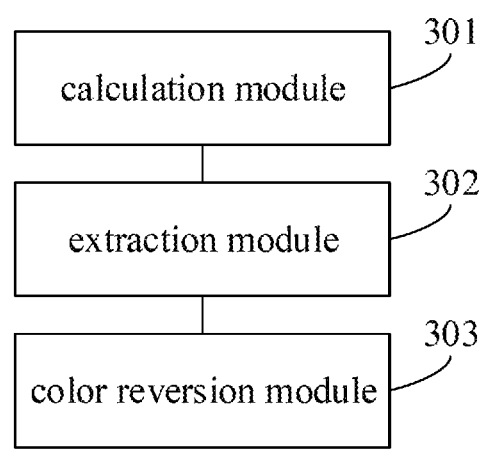
FIG. 3 is a block diagram of a device for processing a page according to an exemplary aspect of the present disclosure.

FIG. 3 is a block diagram of a device for processing a page according to an exemplary aspect. As shown in FIG. 3, the device includes a calculation module 301, an extraction module 302 and a color reversion module 303.

The calculation module 301 is configured to calculate an average brightness value of pixels in a page, and judge whether the average brightness value exceeds a preset brightness threshold. The preset brightness threshold is used to specify a minimum brightness for a brighter page.

The extraction module 302 is configured to extract target pixels from the page in the case that the average brightness value exceeds a preset brightness threshold. The target pixels include at least one of first target pixels and second target pixels. The first target pixels are pixels respectively including sub-pixels, any two of which have a brightness difference smaller than a preset difference, and the second target pixels include background pixels and character pixels.

The color reversion module 303 is configured to perform a color reversion operation on the target pixels.

With the device provided by the present aspect, by calculating an average brightness value of pixels in a page, judging whether the average brightness value exceeds a preset brightness threshold, extracting target pixels from the page in the case that the average brightness value exceeds a preset brightness threshold, and performing a color reversion operation on the target pixels, it is able to reduce brightness of the page with contrast of the page being remained unchanged, and thus influence of brightness reduction on definition of the page can be avoid.

In some aspects, the target pixels may include the first target pixels, and the extraction module 302 may include: a determination unit configured to determine, for each pixel in the page, brightness of each of sub-pixels of the pixel; a calculation unit configured to calculate brightness difference between every two sub-pixels between different sub-pixels; and an extraction unit configured to extract the pixel from the page in the case that the brightness difference between every two sub-pixels is less than a preset difference value.

In some aspects, the target pixels may include the second target pixels, and the extraction module 302 may include: an acquisition unit configured to acquire background pixels and character pixels in the page; and an extraction unit configured to extract the background pixels and the character pixels from the page.

In some aspects, the calculation module 301 may be further configured to: calculate a sum of brightness of sub-pixels in the page; calculate a total number of the sub-pixels in the page; and calculate a ratio of the sum of brightness of sub-pixels with respect to the total number of the sub-pixels.

In some aspects, the color reversion module 303 may include: a determination module configured to determine brightness of each of sub-pixels in a target pixel; and a calculation unit configured to calculate, for each of sub-pixels in the target pixel, a difference between a preset maximum brightness and brightness of the sub-pixel, and perform color reversion of the target pixel by using the difference as reversed color of the sub-pixel.

The aspects described above may be combined in any way to form alternative aspects of the present disclosure, which will not be described again herein.

With respect to the device in the above aspect, the specific mode in which each module performs the operation has been described in detail in the aspect relating to the method, and the description thereof will not be described in detail.

It should be noted that the device for processing a page provided by the aspect is exemplified only by division of above-described functional modules when processing a page. In practice, the above-described functions may be assigned to different functional modules as required in order to be implemented. That is, the internal structure of the terminal device may be divided into different functional modules to perform all or part of the functions described above. In addition, the device for processing a page provided by the aspect belongs to the same concept as the method for processing a page in the previous aspects, and thus the specific implementation process thereof may be found by reference to the method aspect for details, which will not be described redundantly.

Figure 4:
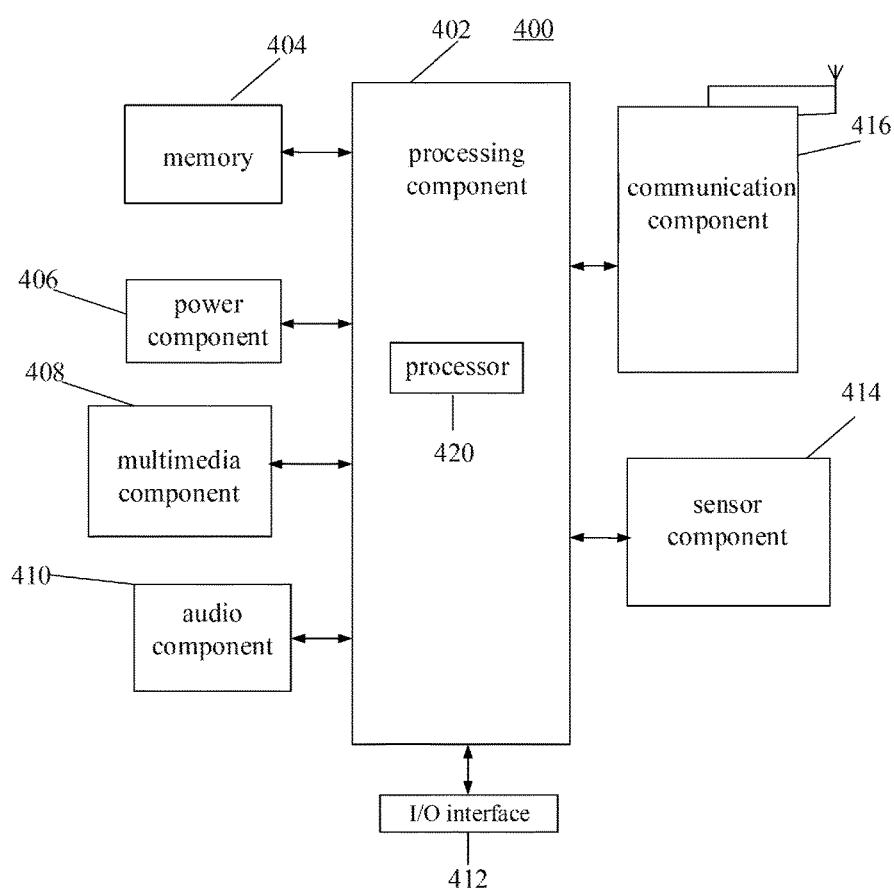
FIG. 4 is a block diagram of a device for processing a page in accordance with an exemplary aspect of the present disclosure.

FIG. 4 is a block diagram of a device 400 for inputting expression information according to an exemplary aspect. For example, the device 400 may be a mobile phone, a computer, a digital broadcast terminal, a messaging device, a gaming console, a tablet, a medical device, an exercise equipment, a personal digital assistant, and the like.

As shown in FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the above described methods for inputting expression information. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swiping action, but also sense a period of time and a pressure associated with the touch or swiping action. In some aspects, the multimedia component 408 includes a front camera and/or a rear camera. The front camera and the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal may be further stored in the memory 404 or transmitted via the communication component 416. In some aspects, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some aspects, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as WiFi, 2G, or 3G, or a combination thereof. In one exemplary aspect, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for inputting expression information.

In exemplary aspects, there is also provided a non-transitory computer-readable storage medium including instructions, such as included in the memory 404, executable by the processor 420 in the device 400, for performing the above-described methods for inputting expression information. For example, the non-transitory computer-readable storage medium may be a ROM, a RAM, a CD-ROM, a magnetic tape, a floppy disc, an optical data storage device, and the like.

There is also provided a non-transitory computer readable storage medium having instructions thereon, which when executed by a processor of a terminal device, cause the terminal device to perform a method for processing a page. The method includes: calculating an average brightness value of pixels in a page, and judging whether the average brightness value exceeds a preset brightness threshold; extracting target pixels from the page in the case that the average brightness value exceeds a preset brightness threshold, wherein the target pixels include at least one of first target pixels and second target pixels, the first target pixels being pixels respectively including sub-pixels, any two of which have a brightness difference smaller than a preset difference, and the second target pixels including background pixels and character pixels; and performing a color reversion operation on the target pixels.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be readily apparent to those skilled in the art upon consideration of the specification and practice of the disclosure disclosed herein.

The present application is intended to cover any variations, uses, or adaptations of the present disclosure that follow the general principles of the present disclosure and including such departures from the present disclosure as come within known or customary practice in the art. It is intended that the specification and examples be considered as illustrative only, with a true scope and spirit of the disclosure being indicated by the following claims.

It is to be understood that this disclosure is not limited to the exact construction described above and shown in the accompanying drawings, and that various modifications and changes may be made without departing from the scope thereof. The scope of the present disclosure is limited only by the appended claims.

What is claimed is:

1. A method for processing a page, comprising:
calculating an average brightness value of pixels in the page on a display;
determining whether the average brightness value exceeds a preset brightness threshold;
selecting target pixels from the page when the average brightness value exceeds the preset brightness threshold, wherein the target pixels include first target pixels, the first target pixels including sub-pixels, any two of sub-pixels in a pixel of the first target pixels have a brightness difference that is less than a preset difference value; and
performing a color reversion operation on the target pixels by:
determining a brightness value of each one of a plurality of sub-pixels in the target pixels;
calculating, for each one of the plurality of sub-pixels in the target pixels, a difference between a preset maximum brightness and the brightness value of the sub-pixel; and
performing a color reversion on the target pixels by using the difference as a reversed color of the sub-pixel.

2. The method of claim 1, wherein the target pixels comprise the first target pixels, wherein each pixel in the page includes a plurality of sub-pixels, and wherein selecting the target pixels from the page comprises:
determining, for each pixel in the page, a brightness value of each of the plurality of sub-pixels of the pixel;
calculating a brightness difference between each of the plurality of sub-pixels of the pixel; and
selecting the pixel from the page when the brightness difference between each of the plurality of sub-pixels of the pixel is less than the preset difference value.

3. The method according to claim 1, wherein calculating the average brightness value of the pixels in the page comprises:
calculating a sum of brightness values of all sub-pixels in the page;
calculating a total number of the sub-pixels in the page; and
calculating a ratio of the sum of brightness values of the sub-pixels with respect to the total number of the sub-pixels.

4. A device for processing a page, comprising:
a display;
a processor; and
a memory for storing instructions executable by the processor, wherein the processor is configured to:
calculate an average brightness value of pixels in the page on the display;

determine whether the average brightness value exceeds a preset brightness threshold;

select target pixels from the page when the average brightness value exceeds the preset brightness threshold, wherein the target pixels include first target pixels, the first target pixels-including sub-pixels, any two of sub-pixels in a pixel of the first target pixels have a brightness difference that is less than a preset difference value; and perform a color reversion operation on the target pixels by:

determining a brightness value of each one of a plurality of sub-pixels in the target pixels;

calculating, for each one of the plurality of sub-pixels in the target pixels, a difference between a preset maximum brightness and the brightness value of the sub-pixel; and performing a color reversion on the target pixels by using the difference as a reversed color of the sub-pixel.

5. The device of claim 4, wherein the target pixels comprise the first target pixels, wherein each pixel in the page includes a plurality of sub-pixels, and wherein the processor is further configured to:

determine, for each pixel in the page, a brightness value of each of the plurality of sub-pixels of the pixel;

calculate brightness difference between each of the plurality of sub-pixels of the pixel; and select the pixel from the page when the brightness difference between each of the plurality of sub-pixels of the pixel is less than the preset difference value.

6. The device according to claim 4, wherein the processor is further configured to:

calculate a sum of brightness values of all sub-pixels in the page;

calculate a total number of the sub-pixels in the page; and calculate a ratio of the sum of brightness values of the sub-pixels with respect to the total number of the sub-pixels.

7. A non-transitory computer-readable storage medium having instructions that, when executed by one or more processors of a terminal device, cause the terminal device to:

calculate an average brightness value of pixels in a page on a display;

determine whether the average brightness value exceeds a preset brightness threshold;

select target pixels from the page when the average brightness value exceeds the preset brightness threshold, wherein the target pixels include first target pixels, the first target pixels including sub-pixels, any two of sub-pixels in a pixel of the first target pixels have a brightness difference that is less than a preset difference value; and perform a color reversion operation on the target pixels by:

determining a brightness value of each one of a plurality of sub-pixels in the target pixels;

calculating, for each one of the plurality of sub-pixels in the target pixels, a difference between a preset maximum brightness and the brightness value of the sub-pixel; and performing a color reversion on the target pixels by using the difference as a reversed color of the sub-pixel.

* * * * *